US010452838B2

United States Patent
Kennedy (10) Patent No.: US 10,452,838 B2
(45) Date of Patent: Oct. 22, 2019

(54) PROVIDING JOINT ACCESS TO AN ISOLATED COMPUTER OBJECT BY BOTH AN ISOLATED COMPUTER APPLICATION AND A NON-ISOLATED COMPUTER APPLICATION

(71) Applicant: SYMANTEC CORPORATION, Mountain View, CA (US)

(72) Inventor: Mark Kennedy, Gardena, CA (US)

(73) Assignee: SYMANTEC CORPORATION, Mountain View, CA (US)

( * ) Notice: Subject to any disclaimer, the term of this patent is extended or adjusted under 35 U.S.C. 154(b) by 182 days.

(21) Appl. No.: 15/661,715

(22) Filed: Jul. 27, 2017

(65) Prior Publication Data
US 2019/0034622 A1    Jan. 31, 2019

(51) Int. Cl.
*G06F 21/53*    (2013.01)
*G06F 21/55*    (2013.01)
(Continued)

(52) U.S. Cl.
CPC ............ *G06F 21/53* (2013.01); *G06F 21/552* (2013.01); *G06F 21/10* (2013.01); *G06F 21/31* (2013.01);
(Continued)

(58) Field of Classification Search
CPC .. G06F 9/44505; G06F 9/468; G06F 9/45533; G06F 21/53; G06F 21/10;
(Continued)

(56) References Cited

U.S. PATENT DOCUMENTS 6,633,963 B1    10/2003   Ellison et al.
7,886,291 B1 *   2/2011   Jones .................... G06F 21/53
                                                            707/822
(Continued)

OTHER PUBLICATIONS

Guide to Security for Full Virtualization Technologies—Karen Scarfone NIST Special Publication 800-125 Jan. 2011 pp. 35 (Year: 2011).*

(Continued)

*Primary Examiner* — Wasika Nipa
*Assistant Examiner* — Ali H. Cheema
(74) *Attorney, Agent, or Firm* — Maschoff Brennan (57) ABSTRACT

Providing joint access to an isolated computer object by both an isolated computer application and a non-isolated computer application. In one embodiment, a method may include executing a first computer application as a virtualized first computer application in an isolation layer, executing a second computer application as an actual second computer application in an operating system outside the isolation layer, creating a virtualized second computer object in the isolation layer in a location accessible to the virtualized first computer application, creating a gateway third computer object associated with the virtualized second computer object, storing the gateway third computer object outside the isolation layer in a location accessible to the operating system, and enabling joint access to the gateway third computer object by both the virtualized first computer application and the actual second computer application.

12 Claims, 3 Drawing Sheets

(51) Int. Cl.
　　　*G06F 21/31*　　　(2013.01)
　　　*G06F 21/10*　　　(2013.01)
　　　*G06F 21/62*　　　(2013.01)
(52) U.S. Cl.
　　　CPC .......... *G06F 21/55* (2013.01); *G06F 21/6209* (2013.01); *G06F 21/6263* (2013.01); *G06F 2221/2149* (2013.01)
(58) Field of Classification Search
　　　CPC ........ G06F 21/31; G06F 16/10; G06F 21/552; G06F 21/55; G06F 21/6209; G06F 21/6263; G06F 8/61
　　　USPC .................. 717/100, 75; 726/2; 718/104, 1; 380/200; 707/822
　　　See application file for complete search history.

(56) References Cited

U.S. PATENT DOCUMENTS

| | | | | |
|---|---|---|---|---|
| 8,099,596 | B1* | 1/2012 | Rusakov | G06F 21/53 380/200 |
| 8,132,176 | B2* | 3/2012 | Bissett | G06F 9/468 718/104 |
| 9,069,983 | B1* | 6/2015 | Nijjar | G06F 21/6209 |
| 9,602,524 | B2* | 3/2017 | Ghosh | G06F 21/55 |
| 2006/0036570 | A1* | 2/2006 | Schaefer | G06F 9/44505 |
| 2006/0074989 | A1* | 4/2006 | Laborczfalvi | G06F 21/10 |
| 2006/0075381 | A1* | 4/2006 | Laborczfalvi | G06F 9/468 717/100 |
| 2007/0094667 | A1 | 4/2007 | Bissett et al. | |
| 2011/0010756 | A1* | 1/2011 | Choi | G06F 21/31 726/2 |
| 2012/0246647 | A1* | 9/2012 | Ciano | G06F 9/45533 718/1 |
| 2013/0047149 | A1* | 2/2013 | Xu | G06F 8/61 717/175 |
| 2015/0288531 | A1 | 10/2015 | Kumar | |
| 2016/0314298 | A1* | 10/2016 | Martini | G06F 21/53 |
| 2017/0262655 | A1* | 9/2017 | Runkis | G06F 21/6263 |

OTHER PUBLICATIONS

Isolated Program Execution: An Application Transparent Approach for Executing Untrusted Programs Zhenkai Liang, V.N. Venkatakrishnan and R. Sekar IEEE Annual Computer Security Applications Conference (ACSAC 2003) pp. 10 (Year: 2003).*
Towards Access Control for Isolated Applications by Kirill Belyaev and Indrakshi Ray (ICETE 2016)—vol. 4 pp. 12 (Year: 2016).*
United States Patent and Trademark Office; International Search Report and Written Opinion; issued in PCT Application No. PCT/US18/38616; dated Aug. 31, 2018; 7 pages.

* cited by examiner

PROVIDING JOINT ACCESS TO AN ISOLATED COMPUTER OBJECT BY BOTH AN ISOLATED COMPUTER APPLICATION AND A NON-ISOLATED COMPUTER APPLICATION

BACKGROUND

An isolation layer, sometimes also referred to as a sandbox, is a computing environment in which a software application can be executed in isolation. For example, if an application is suspected of being a potentially malicious application, such as a virus, ransomware, or malware, the application may first be executed, or quarantined, in an isolation layer for a quarantine time period. While executing in the isolation layer, the application can be monitored to determine if the application exhibits any malicious behaviors. If so, the suspected application can be confirmed to be a malicious application and can be discarded. If not, the application can be approved for execution in a standard operating environment.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for providing joint access to an isolated computer object by both an isolated computer application and a non-isolated computer application may be performed, at least in part, by a computing device including at least one processor. The method may include executing a first computer application as a virtualized first computer application in an isolation layer, executing a second computer application as an actual second computer application in an operating system outside the isolation layer, creating a virtualized second computer object in the isolation layer in a location accessible to the virtualized first computer application, creating a gateway third computer object associated with the virtualized second computer object, storing the gateway third computer object outside the isolation layer in a location accessible to the operating system, and enabling joint access to the gateway third computer object by both the virtualized first computer application and the actual second computer application.

In some embodiments, the method may further include, prior to the executing of the first computer application as the virtualized first computer application in the isolation layer, identifying the first computer application as a potentially malicious computer application. In some embodiments, the isolation layer may prevent any virtualized computer application executing therein from modifying the operating system and from communicating with any actual computer application executing outside of the isolation layer.

Also, in some embodiments, the virtualized second computer object may be created based on an actual first computer object stored outside the isolation layer in a location accessible to the operating system, and the actual first computer object may remain unmodified upon the creating of the virtualized second computer object and upon the creating of the gateway third computer object. In some embodiments, the method may further include allowing the virtualized first computer application and/or the actual second computer application to modify the gateway third computer object outside the isolation layer without modifying the actual first computer object. In some embodiments, any modification of the gateway third computer object, by either the virtualized first computer application or the actual second computer application, may result in a corresponding modification to the virtualized second computer object. In some embodiments, the gateway third computer object may be an actual computer object. In some embodiments, the gateway third computer object may be a reference to a view of the virtualized second computer object that enables the operating system to interact with the virtualized second computer object as though it were an actual computer object. In some embodiments, the virtualized first computer application may not be capable of modifying the actual first computer object while the actual second computer application may be capable of modifying the actual first computer object. In some embodiments, the virtualized second computer object may be a virtualized file and the actual second computer object may be a file stored in a file system. In some embodiments, the virtualized second computer object may be one of a virtualized file system, a virtualized file stored in the virtualized file system, a virtualized network connection, a virtualized portion of memory, a virtualized remote procedure call, and a virtualized registry entry.

Also, in some embodiments, one or more non-transitory computer-readable media may include one or more computer-readable instructions that, when executed by one or more processors, cause the one or more processors to perform a method for providing joint access to an isolated computer object by both an isolated computer application and a non-isolated computer application.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

While an isolation layer may be effective for executing and monitoring a stand-alone-type application, the isolation layer may not be realistic for executing and monitoring an application that seeks to communicate with or share objects with another application that is executing outside the application layer. In particular, a potentially malicious application may be executed, or quarantined, in an isolation layer while a previously-approved application may be simultaneously executing in a standard operating environment outside the isolation layer. Since the potentially malicious application is executing in the isolation layer, the potentially malicious application may be unable to access objects outside the isolation layer, such as a file system, a file stored in the file system, a network connection, a portion of memory, a remote procedure call, or a registry entry. Similarly, since the previously-approved application is operating in the standard operating environment outside the isolation layer, the previously-approved application may be unable to access isolated objects inside the isolation layer, such as a virtualized file system, a virtualized file stored in the virtualized file system, a virtualized network connection, a virtualized portion of memory, a virtualized remote procedure call, or a virtualized registry entry. Therefore, where the isolated object inside the isolation layer is associated with the potentially malicious application also executing in the isolation layer, the previously-approved application executing outside the isolation layer may not be able to access or otherwise share the isolated object with the potentially malicious application.

For example, if a new photo editing application is identified as being potentially malicious, it may be executed, or quarantined, in an isolation layer. During the execution of the photo editing application, the photo editing application may request to access a photo file in a file system outside the isolation layer. In response, a virtualized photo file may be created inside the isolation layer, based on the actual photo file that is outside the isolation layer, and may be accessible to the new photo editing application executing in the isolation layer, thus preventing the new photo editing application from accessing or modifying the actual photo file while allowing the new photo editing application to perhaps believe it is doing so. The new photo editing application may then be employed to update the photo depicted in the virtualized photo file by placing a timestamp of the date and time that was taken on the photo. At the same time, a photo organizing application may be executing in a standard operating environment outside the isolation layer. Since the photo organizing application is outside the isolation layer, the photo organizing application may be unable to access the updated photo in the virtualized photo file inside the isolation layer. Thus, access to an isolated computer object by both an isolated computer application and a non-isolated computer application may be impossible using conventional isolation layer technology.

The embodiments disclosed herein may provide joint access to an isolated computer object by both an isolated computer application and a non-isolated computer application. In some embodiments, this joint access may be accomplished by creating a gateway computer object associated with the virtualized computer object, storing the gateway computer object outside the isolation layer, and enabling joint access to the gateway computer object by both a virtualized computer application and an actual computer application.

For example, if a new photo editing application is executed in an isolation layer where it updates a virtualized photo file, a gateway photo file associated with the virtualized photo file may be created outside the isolation layer to provide joint access by both the isolated new photo editing application and a non-isolated photo organizing application. Where the virtualized photo file was originally based on an actual photo file in an actual file system outside the isolation layer, both the isolated new photo editing application and a non-isolated photo organizing application may modify the gateway photo file without modifying the actual photo file. Any such modification to the gateway photo file may further result in a corresponding modification to the virtualized photo file, thus enabling both the isolated new photo editing application and the non-isolated photo organizing application to effectively share access to the isolated virtualized photo file inside the isolation layer. In this manner, the isolation layer may become a more effective and realistic environment in which to execute and monitor potentially malicious applications.

Figure 1:
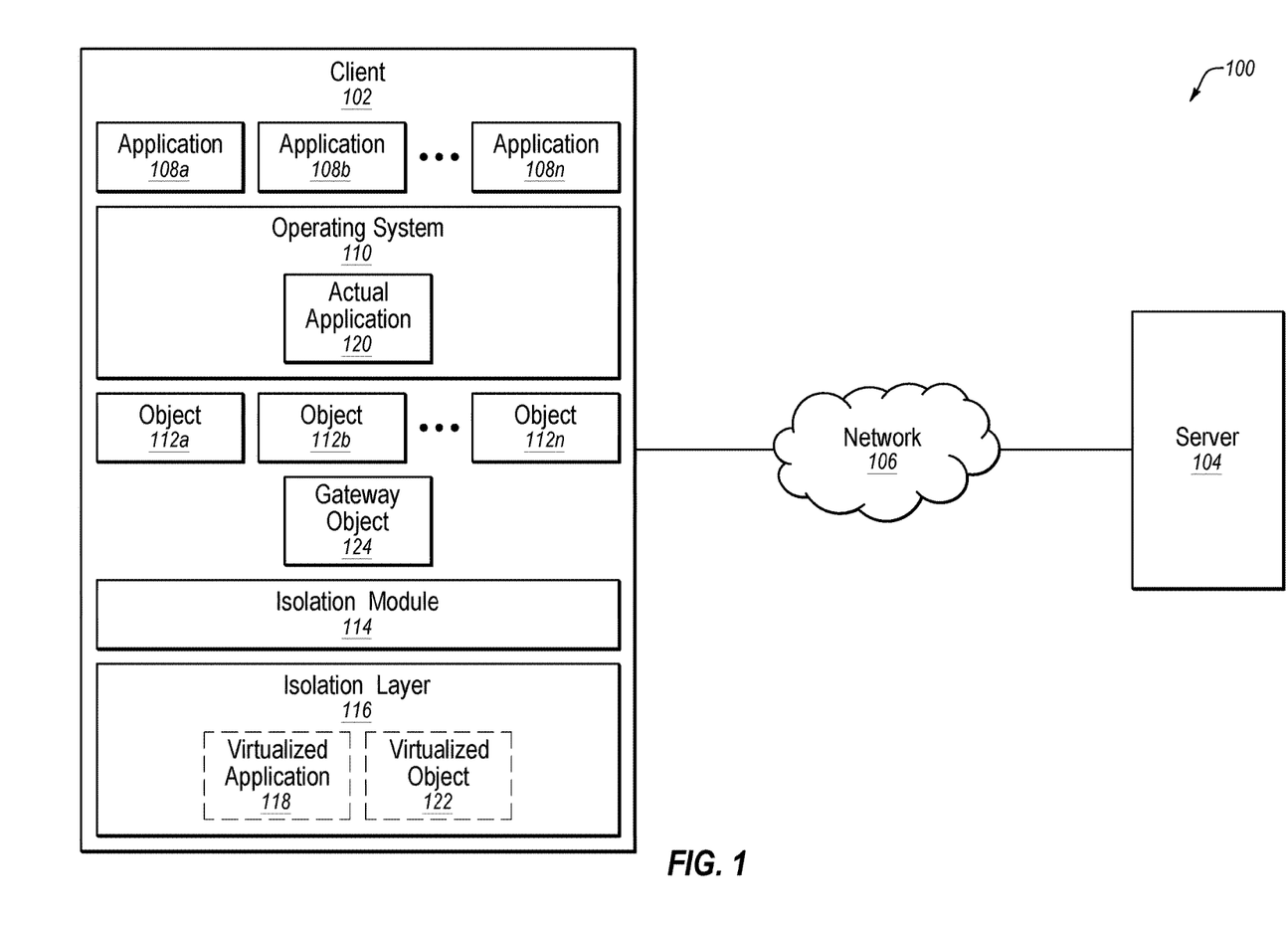
FIG. 1 illustrates an example system configured to manage access to an isolated computer object by both an isolated computer application and a non-isolated computer application.

Turning to the figures, FIG. 1 illustrates an example system 100 configured to manage access to an isolated computer object by both an isolated computer application and a non-isolated computer application. The system 100 may include a client 102, a server 104, and a network 106.

Figure 3:
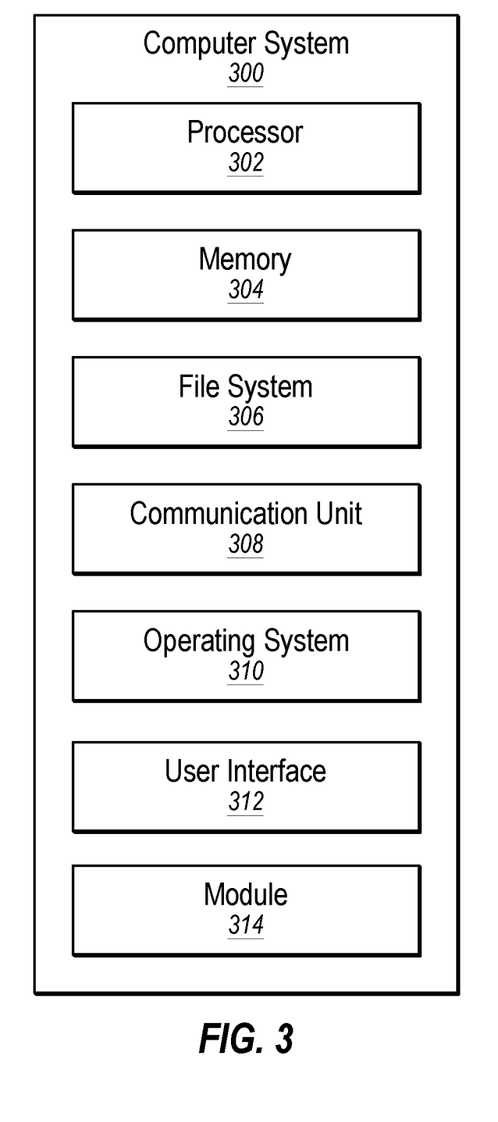
FIG. 3 illustrates an example computer system that may be employed in providing joint access to an isolated computer object by both an isolated computer application and a non-isolated computer application.

In some embodiments, the client 102 may be any computer system, an example of which is disclosed herein in connection with the computer system 300 of FIG. 3. In some embodiments, the client 102 may be configured to communicate over the network 106 with the server 104. The client 102 may include applications 108a, 108b, and 108n. The applications 108a, 108b, and 108n may or may not be currently executing on the client 102. When executing, the applications 108a, 108b, and 108n may be executed in a standard operating environment provided by the operating system 110, or another environment. For example, the application 108b may be executed as the actual application 120 in the standard operating environment provided by the operating system 110. The client 102 may further include objects 112a, 112b, and 112n which each may be any object that is shared among two or more applications including, but not limited to, a file system, a file stored in the file system, a network connection, a portion of memory, a remote procedure call, or a registry entry.

In some embodiments, the client 102 may also include an isolation module 114 and an isolation layer 116. The isolation module 114 may be employed to execute, or quarantine, one or more of the applications 108a-108n in the isolation layer 116 in a virtualized form. For example, the isolation module 114 may be employed to execute the application 108a as the virtualized application 118. Similarly, the isolation module 114 may be employed to bring one or more of the objects 112a-112n into the isolation layer 116 in virtualized forms in response to a request from an isolated application. For example, the isolation module 114 may be employed to bring the object 112a into the isolation layer 114 as the virtualized object 122 in response to a request by the virtualized application 118.

In some embodiments, the isolation module 114 may be configured to provide joint access to an isolated computer object by both an isolated computer application and a non-isolated computer application. For example, the isolation module 114 may be configured to create a gateway object 124 associated with the virtualized object 122, store the gateway object 124 outside the isolation layer 116, and then provide joint access to the gateway object 124 by both the virtualized application 118 and the actual application 120. Where the virtualized object 122 was originally based on the object 112a, both the isolated virtualized application 118 and the non-isolated actual application 120 may modify the gateway object 124 without modifying the object 112a. Any such modification to the gateway object 124 may further result in a corresponding modification to the virtualized object 122, thus enabling both the isolated virtualized application 118 and the non-isolated actual application 120 to effectively share access to the isolated virtualized object 122 inside the isolation layer 116. In this manner, the isolation layer 116 may become a more effective and realistic environment in which to execute and monitor potentially malicious applications.

In some embodiments, the server 104 may be any computer system, an example of which is disclosed herein in connection with the computer system 300 of FIG. 3. In some embodiments, the server 104 may be configured to facilitate communication sessions between the client 102, the server 104, and/or other similar clients or servers over the network 106. For example, the server 104 may operate as a web server and host a website that can be accessed using web browsers executing on the client 102 and other similar clients. In another example, the server 104 may operate as an exchange configured to establish communication sessions, such as telephone calls, video calls, and data sharing sessions between systems or devices such as the client 102 and another system or device. In some embodiments, the server 104 may be configured similarly to the client 102, with each of the components 108a-124. Therefore, the capability of the components 108a-124 of the client 102 may be replicated on the server 104.

In some embodiments, the network 106 may be configured to communicatively couple the client 102 and the server 104 as well as other similar systems and/or devices. In some embodiments, the network 106 may be any wired or wireless network, or combination of multiple networks, configured to send and receive communications between systems and devices. In some embodiments, the network 106 may include a Personal Area Network (PAN), a Local Area Network (LAN), a Metropolitan Area Network (MAN), a Wide Area Network (WAN), a Storage Area Network (SAN), or some combination thereof. In some embodiments, the network 106 may also be coupled to, or may include, portions of a telecommunications network, including telephone lines, for sending data in a variety of different communication protocols, such as a cellular network or a Voice over IP (VoIP) network.

Modifications, additions, or omissions may be made to the system 100 without departing from the scope of the present disclosure. For example, in some embodiments, only a single client 102, or a single server 104 with components similar to the client 102, may be employed to provide joint access to an isolated computer object by both an isolated computer application and a non-isolated computer application. Further, in some embodiments, the system 100 may include additional devices and systems similar to the devices and systems illustrated in FIG. 1 that each may be configured similarly to the devices and systems illustrated in FIG. 1.

Figure 2:
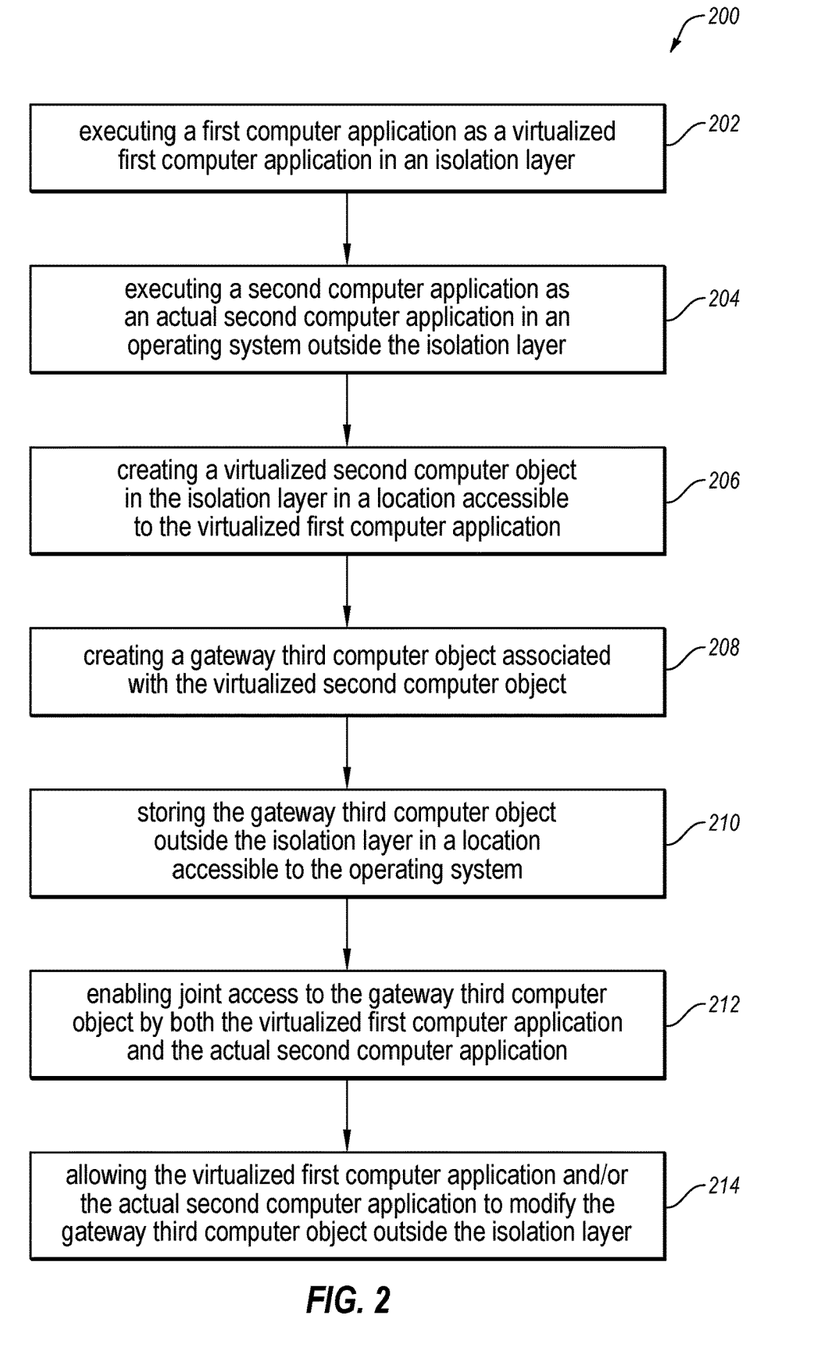
FIG. 2 is a flowchart of an example method for providing joint access to an isolated computer object by both an isolated computer application and a non-isolated computer application.

FIG. 2 is a flowchart of an example method 200 for providing joint access to an isolated computer object by both an isolated computer application and a non-isolated computer application. The method 200 may be performed, in some embodiments, by one or more devices or systems, such as by the operating system 110, the isolation module 114, and/or the isolation layer 116 executing on the client 102 of FIG. 1. In these and other embodiments, the method 200 may be performed by one or more processors based on one or more computer-readable instructions stored on one or more non-transitory computer-readable media. The method 200 will now be described in connection with FIGS. 1 and 2.

The method 200 may include, at block 202, executing a first computer application as a virtualized first computer application in an isolation layer. In some embodiments, the method 200 may further include, prior to the block 202, identifying the first computer application as a potentially malicious computer application. In some embodiments, the isolation layer may prevent any virtualized computer application executing therein from modifying the operating system and from communicating with any actual computer application executing outside of the isolation layer. For example, the isolation layer 116 may execute, at block 202, the application 108a as the virtualized application 118 in the isolation layer 116 because the application 108a has been identified as a potentially malicious application and to prevent the virtualized application 118 from modifying the operating system 110 and from communicating with any actual computer application (such as the actual application 120) executing outside of the isolation layer 116. The operating system 110 may be associated with the isolation layer 116, for example, due to the isolation layer 116 being a standard feature of the operating system 110 or due to the isolation layer 116 itself being an application that is executing in a standard operating environment provided by the operating system 110.

The method 200 may include, at block 204, executing a second computer application as an actual second computer application in an operating system outside the isolation layer. For example, the operating system 110 may execute, at block 204, the application 108b as the actual application 120 in the operating system 110 outside the isolation layer 116.

The method 200 may include, at block 206, creating a virtualized second computer object in the isolation layer in a location accessible to the virtualized first computer application. In some embodiments, the virtualized second computer object may be one of a virtualized file system, a virtualized file stored in the virtualized file system, a virtualized network connection, a virtualized portion of memory, a virtualized remote procedure call, and a virtualized registry entry. In some embodiments, the virtualized second computer object may be created based on an actual first computer object stored outside the isolation layer in a location accessible to the operating system, and the actual first computer object may remain unmodified upon the creating of the virtualized second computer object. In some embodiments, the virtualized first computer application may not be capable of modifying the actual first computer object while the actual second computer application may be capable of modifying the actual first computer object. For example, the isolation layer 116 may create, at block 206, the virtualized object 122 in the isolation layer 116, in a location accessible to the virtualized application 118. The virtualized object 122 may be based on the object 112a, which is stored outside the isolation layer 116 in a location accessible to the operating system 110, and may be created without modifying the object 112a.

The method 200 may include, at block 208, creating a gateway third computer object associated with the virtualized second computer object. In some embodiments, the gateway third computer object may be an actual computer object. In some embodiments, the gateway third computer object may be a reference to a view of the virtualized second computer object that enables the operating system to interact with the virtualized second computer object as though it were an actual computer object. In some embodiments, where the virtualized second computer object was created based on the actual first computer object discussed above, the actual first computer object may remain unmodified upon the creating of the gateway third computer object. For example, the isolation module 114 may create, at block 208, the gateway object 124 associated with the virtualized object 122 without modifying the object 112a upon which the virtualized object 122 was originally based. The gateway object 124 may be an actual computer object or may be a reference (or pointer) to a view (provided by the isolation module 114, for example) of the virtualized object 122 that enables the operating system 110 to interact with the virtualized object 122 as though it were an actual computer object.

The method 200 may include, at block 210, storing the gateway third computer object outside the isolation layer in a location accessible to the operating system. For example, the isolation module 114 may store, at block 210, the gateway object 124 outside the isolation layer 116 in a location accessible to the operating system 110.

The method 200 may include, at block 212, enabling joint access to the gateway third computer object by both the virtualized first computer application and the actual second computer application. For example, the isolation module 114 may enable joint access, at block 212, to the gateway object 124 by both the virtualized application 118 and the actual application 120.

The method 200 may include, at block 214, allowing the virtualized first computer application and/or the actual second computer application to modify the gateway third computer object outside the isolation layer. In some embodiments, where the virtualized second computer object was created based on the actual first computer object discussed above, the block 214 may be performed without modifying the actual first computer object. In some embodiments, any modification of the gateway third computer object, by either the virtualized first computer application or the actual second computer application, may result in a corresponding modification to the virtualized second computer object. For example, the isolation module 114 may allow, at block 214, the virtualized application 118 and/or the actual application 120 to modify the gateway object 124 outside the isolation layer 116, without modifying the object 112a upon which the virtualized object 122 was originally based. This modification of the gateway object 124 may result in the isolation module 114 making a corresponding modification to the virtualized object 122, thus effectively providing joint access to the isolated virtualized object 122 by both the virtualized application 118 and the actual application 120.

The method 200 may thus be employed, in some embodiments, to provide joint access to an isolated computer object by both an isolated computer application and a non-isolated computer application. In some embodiments, providing joint access to an isolated computer object may enable the isolation layer to be a more effective and realistic environment in which to execute and monitor a potentially malicious application. In some embodiments, the isolated application may further be unaware that it is executing in an isolation environment or that the gateway computer object is located outside the isolation environment. In this manner, the isolated application may be able to function more realistically in the isolation environment, which may allow monitoring of the isolated application while it functions similarly to the normal way it would function outside the isolation environment.

Although the blocks of the method 200 are illustrated in FIG. 2 as discrete blocks, various blocks may be divided into additional blocks, combined into fewer blocks, reordered, expanded, or eliminated, depending on the desired implementation. For example, in some embodiments, blocks 202-212 may be performed without performing block 214. Further, in some embodiments, the method 200 may include multiple isolated applications, multiple non-isolated applications, multiple isolated objects, and/or multiple gateway objects. Therefore, the discussion in the method 200 of a single isolated application, a single non-isolated application, a single isolated object, and a single gateway object is only one example embodiment, and embodiments with two or more of any of these components may also be employed.

Further, it is understood that the method 200 may improve the functioning of a computer system itself. For example, the functioning of the client 102 of FIG. 1 may itself be improved by the method 200 because a potentially malicious application and an associated isolated object may be isolated in the isolation layer 116, and then a gateway object may be created outside the isolation layer to provide joint access by the potentially malicious application and a non-isolated application, thus enabling the isolated application to function more realistically in the isolation environment. In this manner, monitoring of the isolated application may take place while the isolated application functions similarly to the way it would function outside the isolation layer, unlike conventional isolation layers which simply deny any joint access of objects by both an isolated application and a non-isolated application.

Also, the method 200 may improve the technical field of malicious application detection at least because conventional isolation layer configurations do not allow any objects inside the isolation layer to be accessed by a non-isolated application. The ability of the isolation layer disclosed herein to effectively share an isolated object with a non-isolated application may allow for a more realistic execution of an isolated application, thereby enabling a more accurate determination as to whether the isolated application is in fact a malicious application.

FIG. 3 illustrates an example computer system 300 that may be employed in providing joint access to an isolated computer object by both an isolated computer application and a non-isolated computer application. In some embodiments, the computer system 300 may be part of any of the systems or devices described in this disclosure. For example, the computer system 300 may be part of any of the network devices or the verification server of FIG. 1.

The computer system 300 may include a processor 302, a memory 304, a file system 306, a communication unit 308, an operating system 310, a user interface 312, and a module 314, which all may be communicatively coupled. In some embodiments, the computer system may be, for example, a desktop computer, a client computer, a server computer, a mobile phone, a laptop computer, a smartphone, a smartwatch, a tablet computer, a portable music player, or any other computer system.

Generally, the processor 302 may include any suitable special-purpose or general-purpose computer, computing entity, or processing device including various computer hardware or software modules and may be configured to execute instructions stored on any applicable computer-readable storage media. For example, the processor 302 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 302 may interpret and/or execute program instructions and/or process data stored in the memory 304 and/or the file system 306. In some embodiments, the processor 302 may fetch program instructions from the file system 306 and load the program instructions into the memory 304. After the program instructions are loaded into the memory 304, the processor 302 may execute the program instructions. In some embodiments, the instructions may include the processor 302 performing one or more blocks of the method 200 of FIG. 2.

The memory 304 and the file system 306 may include computer-readable storage media for carrying or having stored thereon computer-executable instructions or data structures. Such computer-readable storage media may be any available non-transitory media that may be accessed by a general-purpose or special-purpose computer, such as the processor 302. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 302 to perform a certain operation or group of operations, such as one or more blocks of the method 200 of FIG. 2. These computer-executable instructions may be included, for example, in the operating system 310, in one or more applications, such as the module 314, or in some combination thereof.

The communication unit 308 may include any component, device, system, or combination thereof configured to transmit or receive information over a network, such as the network 106 of FIG. 1. In some embodiments, the communication unit 308 may communicate with other devices at other locations, the same location, or even other components within the same system. For example, the communication unit 308 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 308 may permit data to be exchanged with a network and/or any other devices or systems, such as those described in the present disclosure.

The operating system 310 may be configured to manage hardware and software resources of the computer system 300 and configured to provide common services for the computer system 300, and may correspond to the operating system 110 of FIG. 1.

The user interface 312 may include any device configured to allow a user to interface with the computer system 300. For example, the user interface 312 may include a display, such as an LCD, LED, or other display, that is configured to present video, text, application user interfaces, and other data as directed by the processor 302. The user interface 312 may further include a mouse, a track pad, a keyboard, a touchscreen, volume controls, other buttons, a speaker, a microphone, a camera, any peripheral device, or other input or output device. The user interface 312 may receive input from a user and provide the input to the processor 302. Similarly, the user interface 312 may present output to a user.

The module 314 may be one or more computer-readable instructions stored on one or more non-transitory computer-readable media, such as the memory 304 or the file system 306, that, when executed by the processor 302, is configured to perform one or more blocks of the method 200 of FIG. 2. In some embodiments, the module 314 may be part of the operating system 310 or may be part of an application of the computer system 300, or may be some combination thereof. In some embodiments, the module 314 may function as the isolation module 114 of FIG. 1.

Modifications, additions, or omissions may be made to the computer system 300 without departing from the scope of the present disclosure. For example, although each is illustrated as a single component in FIG. 3, any of the components 302-314 of the computer system 300 may include multiple similar components that function collectively and are communicatively coupled. Further, although illustrated as a single computer system, it is understood that the computer system 300 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 302 of FIG. 3) including various computer hardware or software modules, as discussed in greater detail below. Further, as indicated above, embodiments described herein may be implemented using computer-readable media (e.g., the memory 304 or file system 306 of FIG. 3) for carrying or having computer-executable instructions or data structures stored thereon.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for providing joint access to an isolated computer object by both an isolated computer application and a non-isolated computer application, at least a portion of the method being performed by a computing device comprising at least one processor, the method comprising:
   executing a first computer application as a virtualized first computer application in an isolation layer;
   executing a second computer application as an actual second computer application in an operating system outside the isolation layer;
   creating a virtualized second computer object in the isolation layer in a location accessible to the virtualized first computer application, the virtualized second computer object being created based on an actual first computer object stored outside the isolation layer in a location accessible to the operating system, the actual first computer object remaining unmodified upon the creating of the virtualized second computer object;
   creating a gateway third computer object associated with the virtualized second computer object, the actual first computer object remaining unmodified upon the creating of the gateway third computer object;
   storing the gateway third computer object outside the isolation layer in a location accessible to the operating system, the gateway third computer object being an actual computer object or being a reference to a view of the virtualized second computer object that enables the operating system to interact with the virtualized second computer object as though it were an actual computer object;
   enabling joint access to the gateway third computer object by both the virtualized first computer application and the actual second computer application; and
   allowing the virtualized first computer application and/or the actual second computer application to modify the gateway third computer object outside the isolation layer without modifying the actual first computer object.

2. The method of claim 1, wherein any modification of the gateway third computer object, by either the virtualized first computer application or the actual second computer application, results in a corresponding modification to the virtualized second computer object.

3. The method of claim 2, wherein: the virtualized first computer application is not capable of modifying the actual first computer object; and
   the actual second computer application is capable of modifying the actual first computer object.

4. The method of claim 1, further comprising: prior to the executing of the first computer application as the virtualized first computer application in the isolation layer, identifying the first computer application as a potentially malicious computer application.

5. The method of claim 1, wherein the isolation layer prevents any virtualized computer application executing therein from modifying the operating system and from communicating with any actual computer application executing outside of the isolation layer.

6. The method of claim 1, wherein: the virtualized second computer object is a virtualized file; and
   the gateway third computer object is a file stored in a file system.

7. The method of claim 1, wherein the virtualized second computer object is one of a virtualized file system, a virtualized file stored in the virtualized file system, a virtualized network connection, a virtualized portion of memory, a virtualized remote procedure call, and a virtualized registry entry.

8. A computer-implemented method for providing joint access to an isolated computer object by both an isolated computer application and a non-isolated computer application, at least a portion of the method being performed by a computing device comprising at least one processor, the method comprising:
   executing a first computer application as a virtualized first computer application in an isolation layer;
   executing a second computer application as an actual second computer application in an operating system outside the isolation layer;
   creating a virtualized second computer object in the isolation layer in a location accessible to the virtualized first computer application, based on an actual first computer object stored outside the isolation layer in a location accessible to the operating system, and without modifying the actual first computer object;

creating a gateway third computer object, associated with the virtualized second computer object, and without modifying the actual first computer object;

storing the gateway third computer object outside the isolation layer in a location accessible to the operating system, the gateway third computer object being an actual computer object or being a reference to a view of the virtualized second computer object that enables the operating system to interact with the virtualized second computer object as though it were an actual computer object; and enabling modifications to the gateway third computer object by both the virtualized first computer application and the actual second computer application, with any modification of the gateway third computer object, by either the virtualized first computer application or the actual second computer application, resulting in a corresponding modification to the virtualized second computer object.

9. The method of claim 8, wherein: the virtualized first computer application is not capable of modifying the actual first computer object; and the actual second computer application is capable of modifying the actual first computer object.

10. The method of claim 8, wherein: the virtualized second computer object is a file; and the gateway third computer object is a file stored in a file system.

11. One or more non-transitory computer-readable media comprising one or more computer-readable instructions that, when executed by one or more processors of one or more computing devices, cause the one or more computing devices to perform a method for providing joint access to an isolated computer object by both an isolated computer application and a non-isolated computer application, the method comprising:

executing a first computer application as a virtualized first computer application in an isolation layer;

executing a second computer application as an actual second computer application in an operating system outside the isolation layer;

creating a virtualized second computer object in the isolation layer in a location accessible to the virtualized first computer application, based on an actual first computer object stored outside the isolation layer in a location accessible to the operating system, and without modifying the actual first computer object;

creating a gateway third computer object, associated with the virtualized second computer object, and without modifying the actual first computer object;

storing the gateway third computer object outside the isolation layer in a location accessible to the operating system, the gateway third computer object being an actual computer object or being a reference to a view of the virtualized second computer object that enables the operating system to interact with the virtualized second computer object as though it were an actual computer object; and enabling modifications to the gateway third computer object by both the virtualized first computer application and the actual second computer application, with any modification of the gateway third computer object, by either the virtualized first computer application or the actual second computer application, resulting in a corresponding modification to the virtualized second computer object.

12. The one or more non-transitory computer-readable media of claim 11, wherein: the virtualized first computer application is not capable of modifying the actual first computer object; and the actual second computer application is capable of modifying the actual first computer object.

* * * * *